US012099698B2

(12) United States Patent
Desserrey et al.

(10) Patent No.: US 12,099,698 B2
(45) Date of Patent: *Sep. 24, 2024

(54) CONTEXTUAL SENDING MENU

(71) Applicant: Snap Inc., Santa Monica, CA (US)

(72) Inventors: Laurent Desserrey, Los Angeles, CA (US); Dylan Shane Eirinberg, Venice, CA (US); Matthew Colin Grantham, Toronto (CA); David Whyte, Toronto (CA)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/812,627

(22) Filed: Jul. 14, 2022

(65) Prior Publication Data

US 2023/0004262 A1 Jan. 5, 2023

Related U.S. Application Data

(63) Continuation of application No. 17/303,943, filed on Jun. 10, 2021, now Pat. No. 11,392,275.

(Continued)

(51) Int. Cl.
*G06F 3/048* (2013.01)
*G06F 3/04817* (2022.01)
(Continued)

(52) U.S. Cl.
CPC ........ *G06F 3/0482* (2013.01); *G06F 3/04817* (2013.01); *G06F 3/04842* (2013.01); *H04L 51/046* (2013.01); *H04L 51/10* (2013.01)

(58) Field of Classification Search
None
See application file for complete search history.

(56) References Cited

U.S. PATENT DOCUMENTS

| 9,836,207 B2* | 12/2017 | Langholz ............. G06F 3/0481 |
| 11,392,275 B2 | 7/2022 | Desserrey et al. |
| 2015/0082201 A1 | 3/2015 | Sung et al. |
| 2015/0320799 A1 | 11/2015 | Low et al. |

(Continued)

FOREIGN PATENT DOCUMENTS

| CN | 110268437 A | 9/2019 |
| CN | 110300951 A | 10/2019 |

(Continued)

OTHER PUBLICATIONS

U.S. Appl. No. 17/303,943 U.S. Appl. No. 11/392,275, filed Jun. 10, 2021, Contextual Sending Menu.

(Continued)

*Primary Examiner* — Thanh T Vu
(74) *Attorney, Agent, or Firm* — Schwegman Lundberg & Woessner, P.A.

(57) ABSTRACT

Method of generating contextual sending menu starts with processor causing first client device to display first and second portion of display screen in inactivated position. Processor receives selection from first user of first client device of chat selectable item in application interface. Chat selectable item is associated with communication interface of messaging system. In response to receiving the selection, processor generates media content item based on context of first client device and causes first portion and second portion of display screen to be displayed in an activated position by causing first portion to contract, and causing second portion to expand and to comprise a preview of media content item and selectable item associated with second user. Processor then receives from the first user selection of the selectable item associated with the second user, and transmits media content item to second client device. Other embodiments are also disclosed herein.

21 Claims, 10 Drawing Sheets

Related U.S. Application Data

(60) Provisional application No. 63/037,557, filed on Jun. 10, 2020.

(51) Int. Cl.
    *G06F 3/0482*    (2013.01)
    *G06F 3/04842*    (2022.01)
    *H04L 51/046*    (2022.01)
    *H04L 51/10*    (2022.01)

(56) References Cited

U.S. PATENT DOCUMENTS

| | | | |
|---|---|---|---|
| 2016/0077698 A1 | 3/2016 | Gunderson et al. | |
| 2016/0202889 A1 | 7/2016 | Shin et al. | |
| 2017/0093769 A1* | 3/2017 | Lind | G06F 3/1454 |
| 2018/0367483 A1 | 12/2018 | Rodriguez et al. | |
| 2019/0394147 A1* | 12/2019 | Rodriguez | H04L 51/046 |
| 2020/0145242 A1 | 5/2020 | Libin | |
| 2021/0389852 A1 | 12/2021 | Desserrey et al. | |

FOREIGN PATENT DOCUMENTS

| | | |
|---|---|---|
| CN | 115701304 A | 2/2023 |
| EP | 2339800 A1 | 6/2011 |
| KR | 20140127553 A | 11/2014 |
| KR | 20170032883 A | 3/2017 |
| KR | 20180050636 A | 5/2018 |
| WO | WO-2021253048 A1 | 12/2021 |

OTHER PUBLICATIONS

"U.S. Appl. No. 17/303,943, Non Final Office Action dated Oct. 13, 2021", 8 pgs.

"U.S. Appl. No. 17/303,943, Notice of Allowance dated Mar. 16, 2022", 7 pgs.

"U.S. Appl. No. 17/303,943, Response filed Jan. 13, 2022 to Non Final Office Action dated Oct. 13, 2021", 13 pgs.

"International Application Serial No. PCT/US2021/070692, International Search Report dated Sep. 30, 2021", 3 pgs.

"International Application Serial No. PCT/US2021/070692, Written Opinion dated Sep. 30, 2021", 4 pgs.

"International Application Serial No. PCT/US2021/070692, International Preliminary Report on Patentability dated Dec. 22, 2022", 6 pgs.

"Chinese Application Serial No. 202180041725.3, Office Action dated Jul. 30, 2023", W/O English Translation, 5 pgs.

"European Application Serial No. 21822683.5, Response filed Jul. 27, 2023 to Communication pursuant to Rules 161(2) and 162 EPC dated Jan. 19, 2023", 23 pgs.

"Chinese Application Serial No. 202180041725.3, Response filed Nov. 2, 2023 to Office Action mailed Jul. 30, 2023", w/ current English claims, 8 pgs.

"European Application Serial No. 21822683.5, Extended European Search Report mailed Feb. 2, 2024", 10 pgs.

"Korean Application Serial No. 10-2023-7000054, Notice of Preliminary Rejection mailed May 1, 24", w/ English translation, 15 pgs.

* cited by examiner

CONTEXTUAL SENDING MENU

CLAIM OF PRIORITY

This application is a continuation of U.S. patent application Ser. No. 17/303,943, filed Jun. 10, 2021, which application claims the benefit of priority to U.S. Provisional Application Ser. No. 63/037,557, filed Jun. 10, 2020, which is incorporated herein by reference in its entirety.

BACKGROUND

Electronic messaging, particularly instant messaging, continues to grow globally in popularity. Users are quickly able to share with one another electronic media content items including text, electronic images, audio, and video instantly.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

With the increasing number of users on social networking systems, each user also has a growing network of individuals that she follows. Therefore, in order to maintain the user's engagement on social networking systems, it is paramount that the systems have the ability to present to each user the media content items that are most interesting or relevant to her. In addition to the need to curate the media content items, the social networking systems are also presented with the challenge of providing a graphical user interface that captivates the user's attention and allows her to view the curated media content items and further interact the network of individuals that she follows.

In messaging systems, users are connected to a variety of other users with whom they have different levels and types of relationships. Users can interact with one another in the messaging system by exchanging messages, audio visual content, links to content on the Internet, etc.

Embodiments of the present disclosure improve the functionality of electronic messaging software and systems by generating a platform on which the user can access applications and by generating an action bar based on the user's client device's context. Specifically, the action bar that is generated and displayed on the user's client device is contextual in that the contents of the action bar menu can be dependent on the application that is currently running on the user's client device. In response to selections in the application, the action bar can also be caused to display a contextual sending interface that includes a preview of the media content item from the application to be sent and a list of the users that are associated with the user on this application or on the messaging device. Selectable items (e.g., icons, images, text) identifying these users can also be displayed in the contextual sending menu such that the user can quickly access these users in order to send them content or messages related to the application.

Embodiments of the present disclosure also improve on the functionality of electronic messaging software and systems by providing for a shared placement of the action bar, from which the settings menu can be accessed, across applications being executed on the client device. The action bar can be native to the messaging system but dynamically adaptable to incorporate elements that are related to the current context of the client device, such as the application that is currently being accessed by the user on the client device. By ensuring the shared placement of the action bar and the contextual aspect of the settings menu, embodiments of the messaging system improve the user experience such that user engagement with the messaging system can be further increased.

Networked Computing Environment

Figure 1:
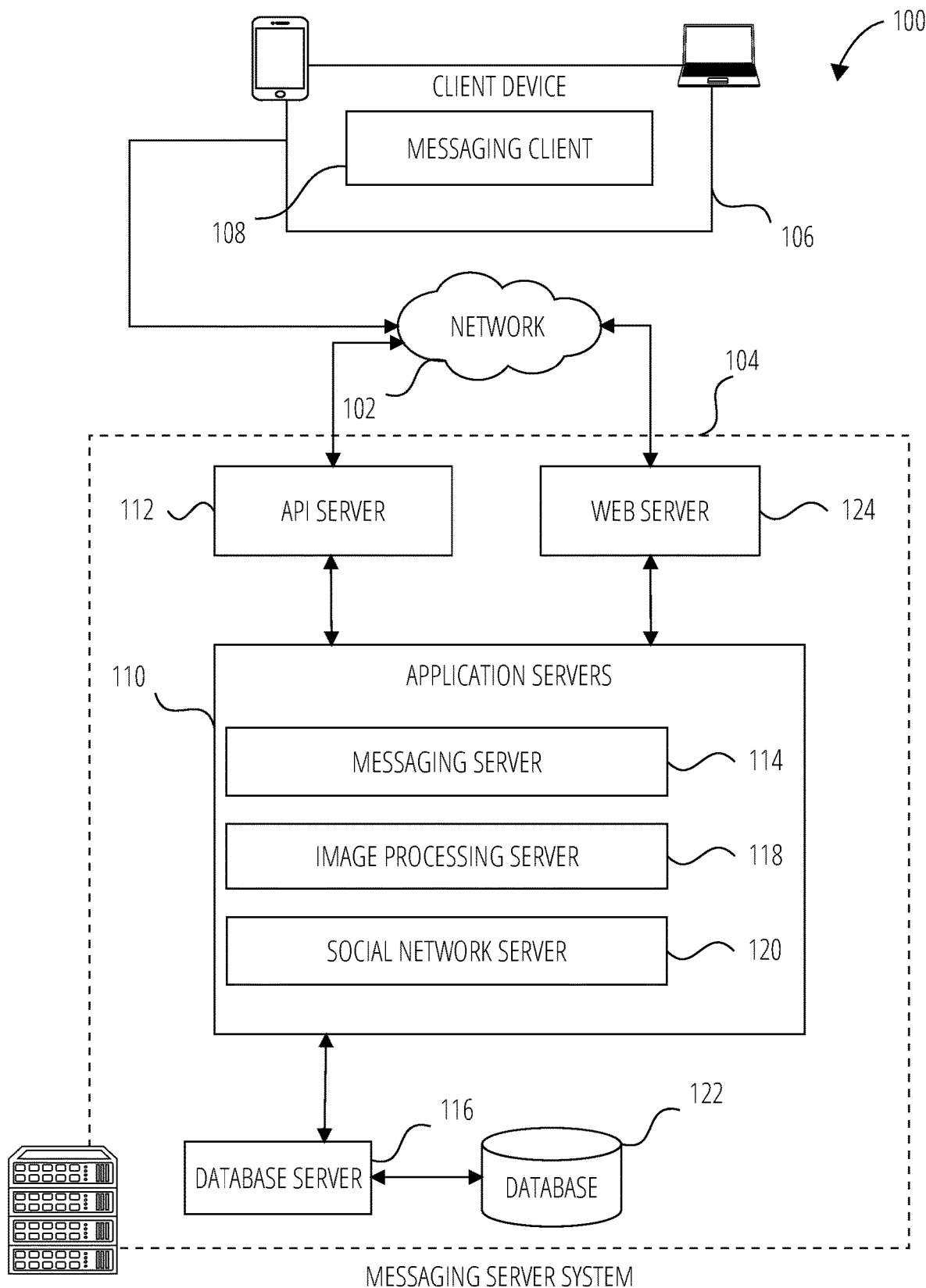
FIG. 1 is a diagrammatic representation of a networked environment in which the present disclosure may be deployed, in accordance with some examples.

FIG. 1 is a block diagram showing an example messaging system 100 for exchanging data (e.g., messages and associated content) over a network. The messaging system 100 includes multiple instances of a client device 106, each of which hosts a number of applications, including a messaging client 108. Each messaging client 108 is communicatively coupled to other instances of the messaging client 108 and a messaging server system 104 via a network 102 (e.g., the Internet).

A messaging client 108 is able to communicate and exchange data with another messaging client 108 and with the messaging server system 104 via the network 102. The data exchanged between messaging client 108, and between a messaging client 108 and the messaging server system 104, includes functions (e.g., commands to invoke functions) as well as payload data (e.g., text, audio, video or other multimedia data).

The messaging server system 104 provides server-side functionality via the network 102 to a particular messaging client 108. While certain functions of the messaging system 100 are described herein as being performed by either a messaging client 108 or by the messaging server system 104, the location of certain functionality either within the messaging client 108 or the messaging server system 104 may be a design choice. For example, it may be technically preferable to initially deploy certain technology and functionality within the messaging server system 104 but to later migrate this technology and functionality to the messaging client 108 where a client device 106 has sufficient processing capacity.

The messaging server system 104 supports various services and operations that are provided to the messaging client 108. Such operations include transmitting data to, receiving data from, and processing data generated by the messaging client 108. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 108.

Turning now specifically to the messaging server system 104, an Application Program Interface (API) server 112 is coupled to, and provides a programmatic interface to, application servers 110. The application servers 110 are communicatively coupled to a database server 116, which facilitates access to a database 122 that stores data associated with messages processed by the application servers 110. Similarly, a web server 124 is coupled to the application servers 110, and provides web-based interfaces to the application servers 110. To this end, the web server 124 processes incoming network requests over the Hypertext Transfer Protocol (HTTP) and several other related protocols.

The Application Program Interface (API) server 112 receives and transmits message data (e.g., commands and message payloads) between the client device 106 and the application servers 110. Specifically, the Application Program Interface (API) server 112 provides a set of interfaces (e.g., routines and protocols) that can be called or queried by the messaging client 108 in order to invoke functionality of the application servers 110. The Application Program Interface (API) server 112 exposes various functions supported by the application servers 110, including account registration, login functionality, the sending of messages, via the application servers 110, from a particular messaging client 108 to another messaging client 108, the sending of media files (e.g., images or video) from a messaging client 108 to a messaging server 114, and for possible access by another messaging client 108, the settings of a collection of media data (e.g., story), the retrieval of a list of friends of a user of a client device 106, the retrieval of such collections, the retrieval of messages and content, the addition and deletion of entities (e.g., friends) to an entity graph (e.g., a social graph), the location of friends within a social graph, and opening an application event (e.g., relating to the messaging client 108).

The application servers 110 host a number of server applications and subsystems, including for example a messaging server 114, an image processing server 118, and a social network server 120. The messaging server 114 implements a number of message processing technologies and functions, particularly related to the aggregation and other processing of content (e.g., textual and multimedia content) included in messages received from multiple instances of the messaging client 108. As will be described in further detail, the text and media content from multiple sources may be aggregated into collections of content (e.g., called stories or galleries). These collections are then made available to the messaging client 108. Other processor and memory intensive processing of data may also be performed server-side by the messaging server 114, in view of the hardware requirements for such processing.

The application servers 110 also include an image processing server 118 that is dedicated to performing various image processing operations, typically with respect to images or video within the payload of a message sent from or received at the messaging server 114.

Figure 3:
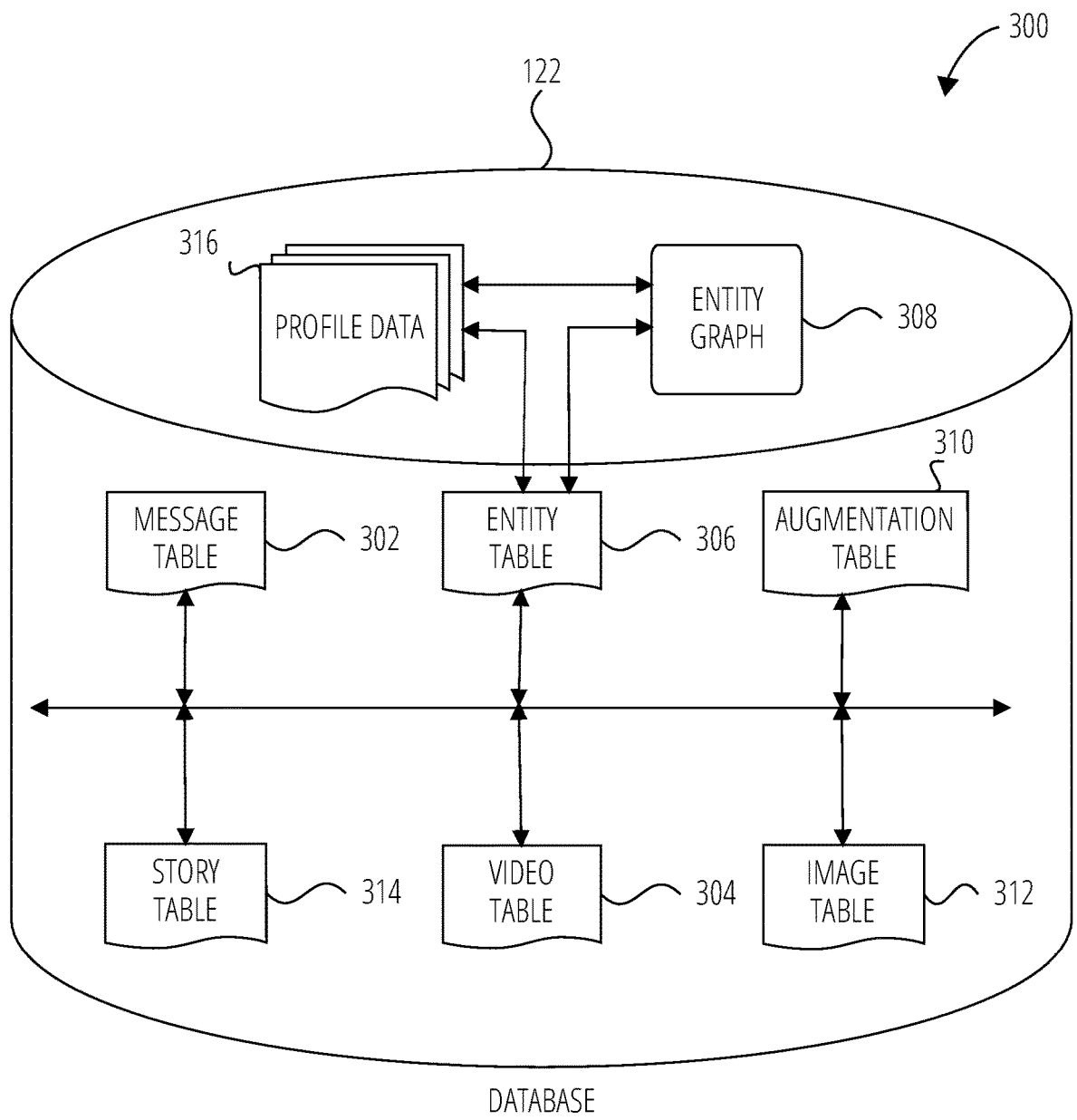
FIG. 3 is a diagrammatic representation of a data structure as maintained in a database, in accordance with some examples.

The social network server 120 supports various social networking functions and services and makes these functions and services available to the messaging server 114. To this end, the social network server 120 maintains and accesses an entity graph 308 (as shown in FIG. 3) within the database 122. Examples of functions and services supported by the social network server 120 include the identification of other users of the messaging system 100 with which a particular user has relationships or is "following," and also the identification of other entities and interests of a particular user.

System Architecture

Figure 2:
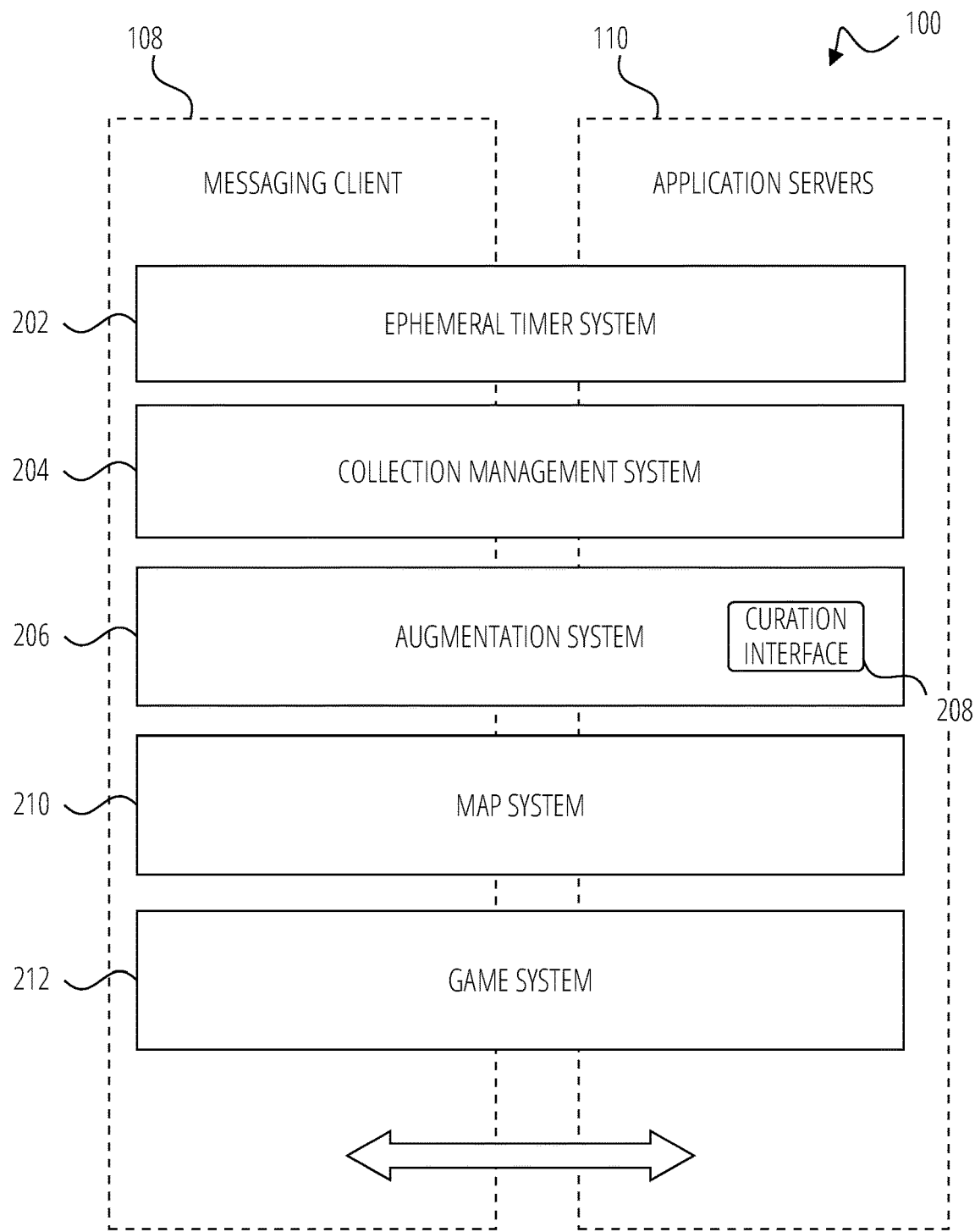
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 108 and the application servers 110. The messaging system 100 embodies a number of subsystems, which are supported on the client-side by the messaging client 108 and on the server-side by the application servers 110. These subsystems include, for example, an ephemeral timer system 202, a collection management system 204, an augmentation system 206, a map system 210, and a game system 212.

The ephemeral timer system 202 is responsible for enforcing the temporary or time-limited access to content by the messaging client 108 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 108. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 108. In one embodiment, the collection management system 204 can be responsible for managing a shared collection of media content items that can only be viewed by a group of users in the messaging system that are selected by the creator of the shared collection (e.g., the private group). In one embodiment, the shared collection of media content items can be modified by the creator of the shared collection as well as the other members of the private group. For example, the collection management system 204 only processes and implements modifications such as adding, deleting, or editing the media content items included in the shared collection that are received from client devices 102 of the members of the private group. The shared collection can also be a "shared story" such that the shared collection be made available for a specified time period, that is enforced by the ephemeral timer system 202.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 108 based on a geolocation of the client device 106. In another example, the augmentation system 206 operatively supplies a media overlay to the messaging client 108 based on other information, such as social network information of the user of the client device 106. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 106. For example, the media overlay may include text or image that can be overlaid on top of a photograph taken by the client device 106. In another example, the media overlay includes an identification of a location overlay (e.g., Venice beach), a name of a live event, or a name of a merchant overlay (e.g., Beach Coffee House). In another example, the augmentation system 206 uses the geolocation of the client device 106 to identify a media overlay that includes the name of a merchant at the geolocation of the client device 106. The media overlay may include other indicia associated with the merchant. The media overlays may be stored in the database 122 and accessed through the database server 116. In one embodiment, the augmentation system 206 generates the invitation media overlays for the shared collection of media content items. The invitation overlay can include a text that identifies the shared collection of media content items. The invitation overlay can also include an avatar of associated with the user that created the shared collection. In some embodiments, the invitation overlay can also include avatars of associated with the users in the private group.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 210 provides various geographic location functions, and supports the presentation of map-based media content and messages by the messaging client 108. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 108. A user can furthermore share his or her location and status information (e.g., using an appropriate status avatar) with other users of the messaging system 100 via the messaging client 108, with this location and status information being similarly displayed within the context of a map interface of the messaging client 108 to selected users.

The game system 212 provides various gaming functions within the context of the messaging client 108. The messaging client 108 provides a game interface providing a list of available games that can be launched by a user within the context of the messaging client 108, and played with other users of the messaging system 100. The messaging system 100 further enables a particular user to invite other users to participate in the play of a specific game, by issuing invitations to such other users from the messaging client 108. The messaging client 108 also supports both the voice and text messaging (e.g., chats) within the context of gameplay, provides a leaderboard for the games, and also supports the provision of in-game rewards (e.g., coins and items).

Data Architecture

FIG. 3 is a schematic diagram illustrating data structures 300, which may be stored in the database 122 of the messaging server system 104, according to certain examples. While the content of the database 122 is shown to comprise a number of tables, it will be appreciated that the data could be stored in other types of data structures (e.g., as an object-oriented database).

The database 122 includes message data stored within a message table 302. This message data includes, for any particular one message, at least message sender data, message recipient (or receiver) data, and a payload. Further details regarding information that may be included in a message, and included within the message data stored in the message table 302 is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 104 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 108 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 122 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 108 when the sending user is composing a message. The user-selected filters can include an invitation media overlay that is associated with a shared collection of media content items.

Other types of filters include geolocation filters (also known as geo-filters), which may be presented to a sending user based on geographic location. For example, geolocation filters specific to a neighborhood or special location may be presented within a user interface by the messaging client 108, based on geolocation information determined by a Global Positioning System (GPS) unit of the client device 106.

Another type of filter is a data filter, which may be selectively presented to a sending user by the messaging client 108, based on other inputs or information gathered by the client device 106 during the message creation process. Examples of data filters include current temperature at a specific location, a current speed at which a sending user is traveling, battery life for a client device 106, or the current time.

Other augmentation data that may be stored within the image table 312 includes augmented reality content items (e.g., corresponding to applying lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 106 and then displayed on a screen of the client device 106 with the modifications. This also includes modifications to stored content, such as video clips in a gallery that may be modified. For example, in a client device 106 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 106 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other examples, other methods and algorithms suitable for face detection can be used. For example, in some embodiments, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 106) and perform complex image manipulations locally on the client device 106 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 106.

In some examples, a computer animation model to transform image data can be used by a system where a user may capture an image or video stream of the user (e.g., a selfie) using a client device 106 having a neural network operating as part of a messaging client application 104 operating on the client device 106. The transformation system operating within the messaging client 108 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 106 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 108 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 108, to contribute content to a particular live story. The live story may be identified to the user by the messaging client 108, based on his or her location. The end result is a "live story" told from a community perspective.

A further type of content collection is known as a "location story," which enables a user whose client device 106 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
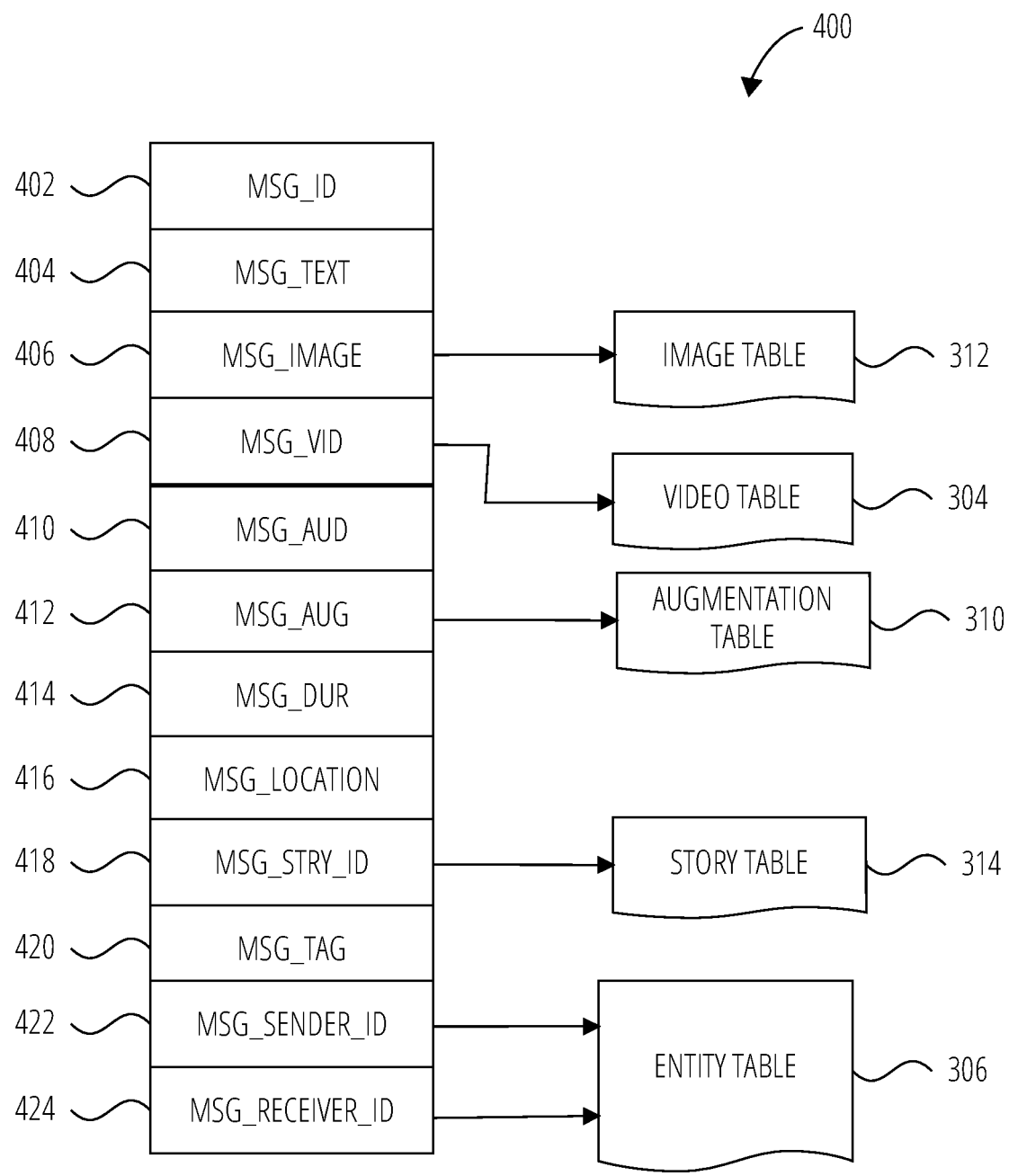
FIG. 4 is a diagrammatic representation of a message, in accordance with some examples.

FIG. 4 is a schematic diagram illustrating a structure of a message 400, according to some examples, generated by a messaging client 108 for communication to a further messaging client 108 or the messaging server 114. The content of a particular message 400 is used to populate the message table 302 stored within the database 122, accessible by the messaging server 114. Similarly, the content of a message 400 is stored in memory as "in-transit" or "in-flight" data of the client device 106 or the application servers 110. A message 400 is shown to include the following example components:

- message identifier 402: a unique identifier that identifies the message 400.
- message text payload 404: text, to be generated by a user via a user interface of the client device 106, and that is included in the message 400.
- message image payload 406: image data, captured by a camera component of a client device 106 or retrieved from a memory component of a client device 106, and that is included in the message 400. Image data for a sent or received message 400 may be stored in the image table 312.
- message video payload 408: video data, captured by a camera component or retrieved from a memory component of the client device 106, and that is included in the message 400. Video data for a sent or received message 400 may be stored in the video table 304.
- message audio payload 410: audio data, captured by a microphone or retrieved from a memory component of the client device 106, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 108.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).
- message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the Client device 106 on which the message 400 was generated and from which the message 400 was sent.
- message receiver identifier 424: an identifier (e.g., a messaging system identifier, email address, or device identifier) indicative of a user of the client device 106 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentations 412 may point to data stored in an augmentation table 310, values stored within the message story identifier 418 may point to data stored in a story table 314, and values stored within the message sender identifier 422 and the message receiver identifier 424 may point to user records stored within an entity table 306.

Contextual Sending Menu

As shown in FIG. 2, the game system 212 provides various gaming functions within the context of the messaging client 108. Games that can be launched by a user within the context of the messaging client 108 can include smaller applications (e.g., "mini-applications") that are sub-applications of a larger main application that provide utility for the larger user base of the main application. The mini-applications can be designed to fit within the platform provided by messaging system 100 and leverage the features of messaging system 100 including the users and the users' list of friends within a social graph, etc.

Figure 5:
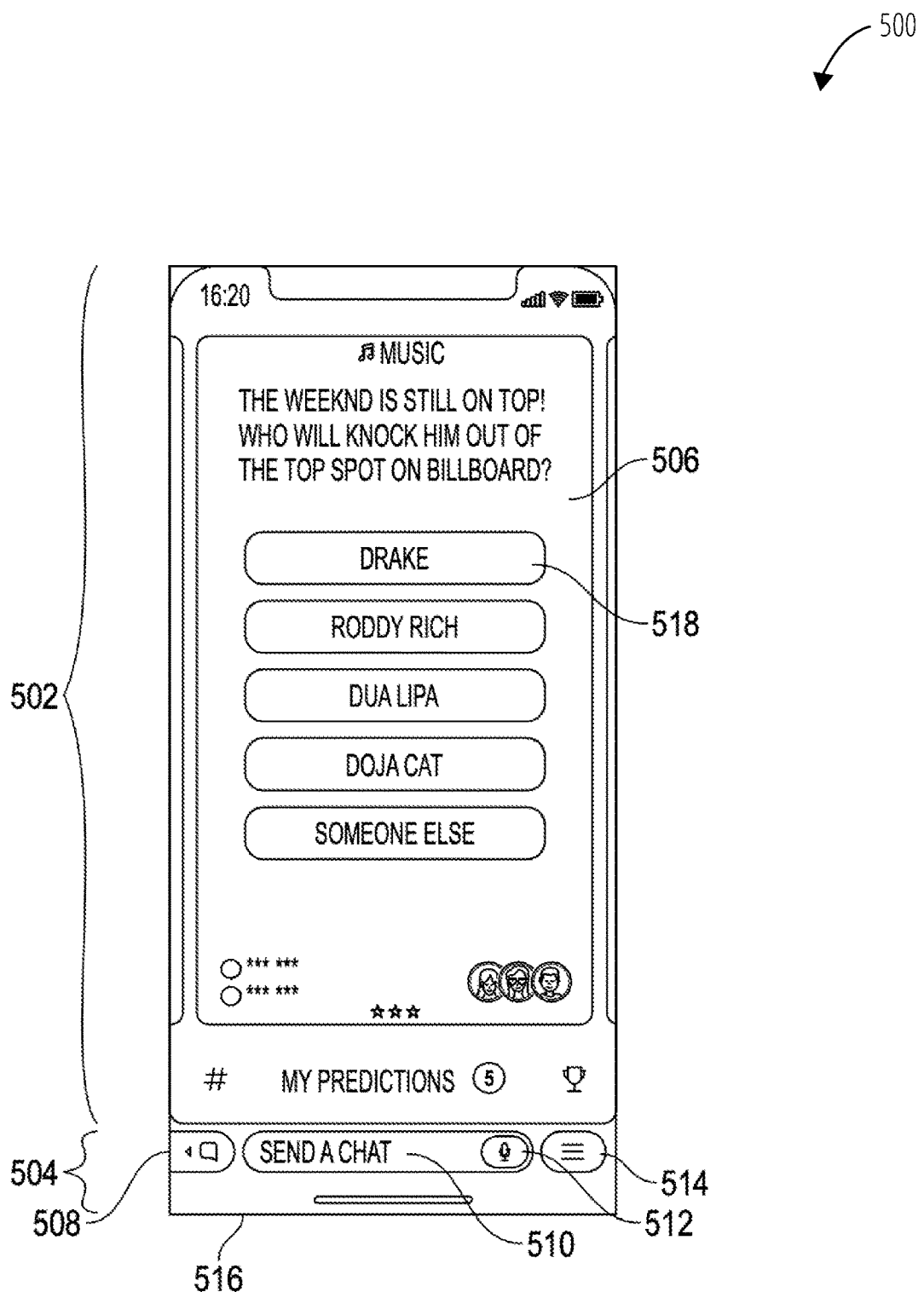
FIG. 5 illustrates an interface 500 in accordance with one embodiment.

The mini-applications can be Hypertext Markup Language version 5 (HTML5) web applications that are games or other programs that can execute within the messaging system 100. The game system 212 or a processor in the client device 106 or a processor in the application servers 110, alone or in combination, can cause the interfaces to be displayed by the client device 106. FIG. 5 illustrates an interface 500 with the first portion 502 and the second portion 504 in an inactivated position in accordance with one embodiment.

A user of the client device 106 can launch a mini-application by selecting a selectable item (e.g., an icon, text, or image) that is associated with the mini-application. The game system 212 can cause a list selectable items associated respectively with a list of available mini-applications that can be executed by the client device 106 within the messaging system 100. Each of the available mini-applications can be associated with application icons that can be selected to execute the mini-application on the client device 106. As shown in FIG. 5, the game system 212 causes the interface 500 to be displayed by the client device 106 in response to the user of the client device 106 selecting a selectable item associated with a mini-application. The interface 500 includes a first portion 502 and a second portion 504 of the display screen in an inactivated position. As illustrated in FIG. 5, the first portion 502 of the display screen is a top portion of the display screen and the second portion 504 of the display screen is a bottom portion of the display screen. The first portion 502 of the display screen in the inactivated position is greater in size than the second portion 504 of the display screen in the inactivated position.

The first portion 502 includes an application interface 506 that is associated with the mini-application that was selected and activated by the user. In FIG. 5, the mini-application is a prediction game that displays questions to the user (e.g., "The Weeknd is still on top! Who will knock him out of the top spot on Billboard?") and provides answer options that can be selected by the user (e.g., Drake, Roddy Rich, Dua Lipa, Doja Cat, and Someone Else). As shown in application interface 506, the game system 212 causes the client device 106 to display the question from the mini-application and a plurality of selectable items (e.g., selectable item 518) associated with the plurality of answer options. Selectable items can be text, links, images, icons, etc.

The second portion 504 includes an action bar 516 that is associated with the game system 212 of the messaging system 100. The action bar 516 can be native to the game system 212 such that it is always present when any mini-application is selected and displayed in the first portion 502. The appearance and functionality of the action bar 516 can differ based on the context or the state of the user of the client device 106 or of the client device 106.

The action bar 516 can comprise a selectable item 508 that can be selected to exit from the mini-application. By activating the selectable item 508, the client device 106 is caused to return the user to the interface from which the user launched the mini-application.

When generating the action bar 516, the game system 212 can determine that the context of the client device 106 includes the user selecting an icon associated with the mini-application from a communication interface for a communication session between a plurality of the users of the messaging system 100. In this example, the client device 106 is caused to display the communication interface when the user selects the selectable item 508.

In another example, the game system 212 can determine that the selectable item associated with the mini-application selected by the user is displayed in a media item viewing interface that allows the user to view images, videos, text, messages, available on the messaging system 100. The selectable item associated with the mini-application could be an overlay on a media content item that was received by the client device 106 and viewed on the media content item viewing interface displayed by the client device 106. Alternatively, the media content item viewing interface can be an interface that allows the user to search or view a list of mini-applications that can be executed on the messaging system 100 (e.g., mini-application search interface, mini-application suggestion interface, etc.). The game system 212 can cause a list selectable items associated respectively with a list of available mini-applications that can be executed by the client device 106 within the messaging system 100. In this example, since the selectable item associated with the mini-application selected by the user is displayed in the media item viewing interface, the client device 106 is caused to display the media item viewing interface when the user selects the selectable item 508.

The action bar 516 can also include a text input element 510 that can receive text input by the user to be shared in the communication interface for the communication session between the user of the client device 106 and other users in the messaging system 100.

The microphone icon 512 in the action bar 516, when activated, can cause the microphone of the client device 106 to start recording acoustic signals. Specifically, the microphone icon 512 can be activated to record the voice of the user of the client device 106 to allow the user to send voice messages to users in the communication session. The voice recording can be displayed in the communication interface as a selectable item and played back by other users receiving the voice recording on their client devices. Alternatively, a voice communication connection between the users in the communication session can be established that allows the users to communicate via audio upon activation of the microphone icon 512.

As shown in FIG. 5, the action bar 516 can also include the settings selectable item 514 that is associated with a settings menu. When settings selectable item 514 is activated by the user of the client device 106, the game system 212 receives a request to display the settings menu. The game system 212 generates the settings menu based on the context of the client device 106.

The context can include information on the mini-application that is currently running in the application interface 506. For example, the information on the mini-application can include the identification (e.g., name, icon, images, etc.) of the mini-application, the type of application of the mini-application (e.g., single player, multiplayer, etc.), or the subject matter associated with the mini-application (e.g., categorizations such as meditation and wellness, fitness, food, culture, fashion, etc.). The context can also include information on the user of the client device 106 such has the user's activity information on the mini-application or the user's selection information on the mini-application, user's game scoring information on the mini-application, user's ranking information on the mini-application. The context can also comprise a list of users associated with the user on the mini-application, or a list of users associated with the user on the messaging system 100.

Figure 6:
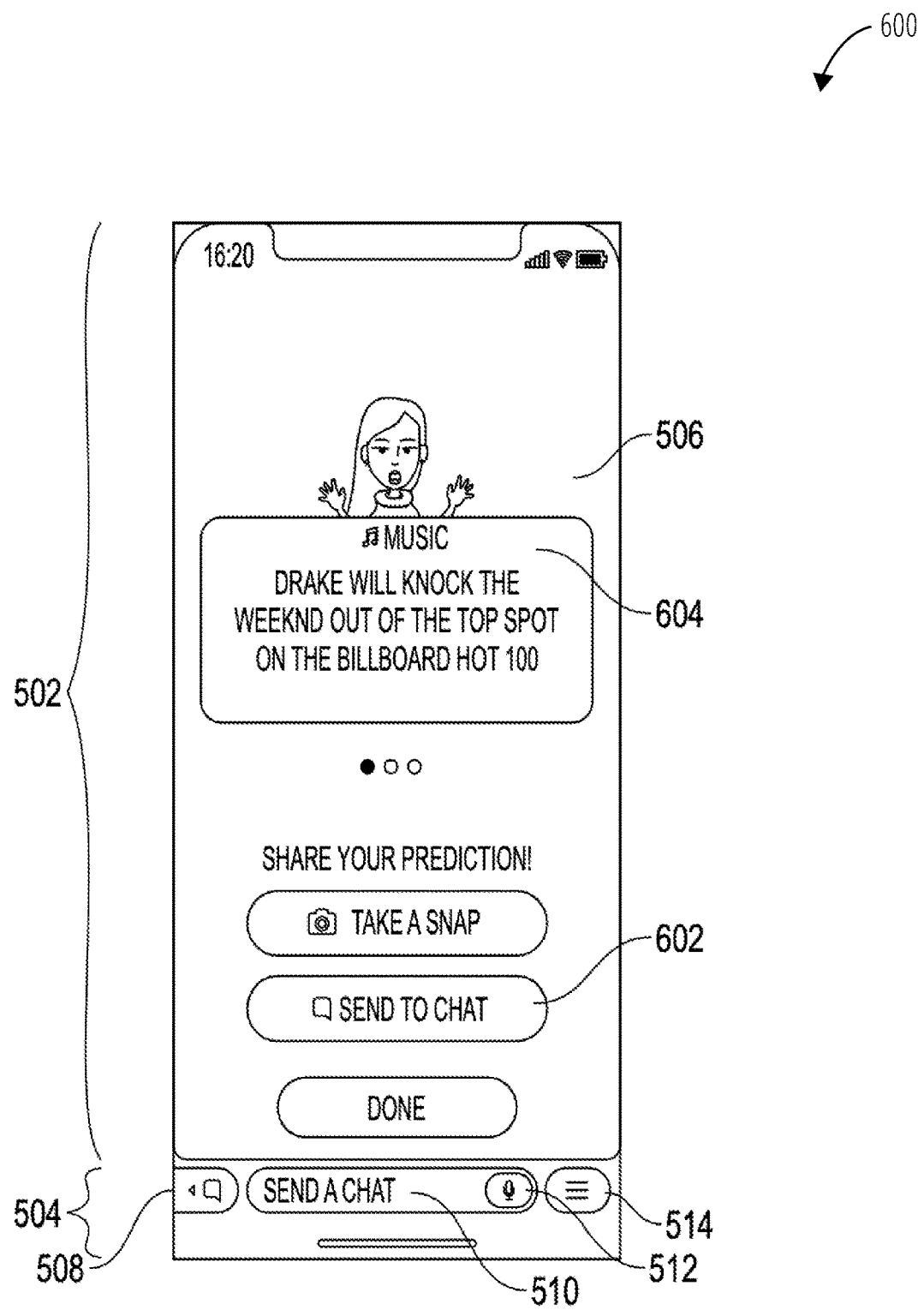
FIG. 6 illustrates an interface 600 in accordance with one embodiment.

FIG. 6 illustrates an interface 600 that is caused to be generated by the client device 106 when the user selects one of the selectable items in the application interface 506 in accordance with one embodiment. For example, when the user activates the selectable item 518 in FIG. 5 to provide "Drake" as his answer, the game system 212 can cause the client device 106 to display the media content item 604 in the application interface 506.

The game system 212 generates the media content item 604 based on a context of the client device 106. In the example in FIG. 5 and FIG. 6, the context of the client device 106 can be that the mini-application currently running on application interface 506 is the prediction application, the current state of the mini-application (e.g., the question that the user responded to (e.g., "The Weeknd is still on top! Who will knock him out of the top spot on Billboard?")), the selection that the user has selected in the application interface 506 (e.g., the selectable item 518 associated with the "Drake" answer), etc.

In FIG. 6, when the user selected the selectable item 518 associated with the answer "Drake", the game system 212 generates media content item 604 to include the answer "Drake". As shown in interface 600, the media content item 604 includes the text that states "Drake will knock The Weeknd out of the top spot on the Billboard Hot 100." The media content item 604 can also include a link that embeds the context. When a client device associated with a second user displays the media content item 604 and the second user selects the media content item 604, the link is activated, and the client device associated with the second user loads the mini-application and displays the application interface 506 with the context. For example, the mini-application can be loaded on the client device associated with the second user to include the first user's answer (e.g., "Drake") or to display the question that was being answered.

As further shown in FIG. 6, the game system 212 can also cause the display of a chat selectable item 602 in the application interface 506 that allows the user to share the media content item 604 with other users associated with the user on the mini-application or on the messaging system 100.

Figure 7:
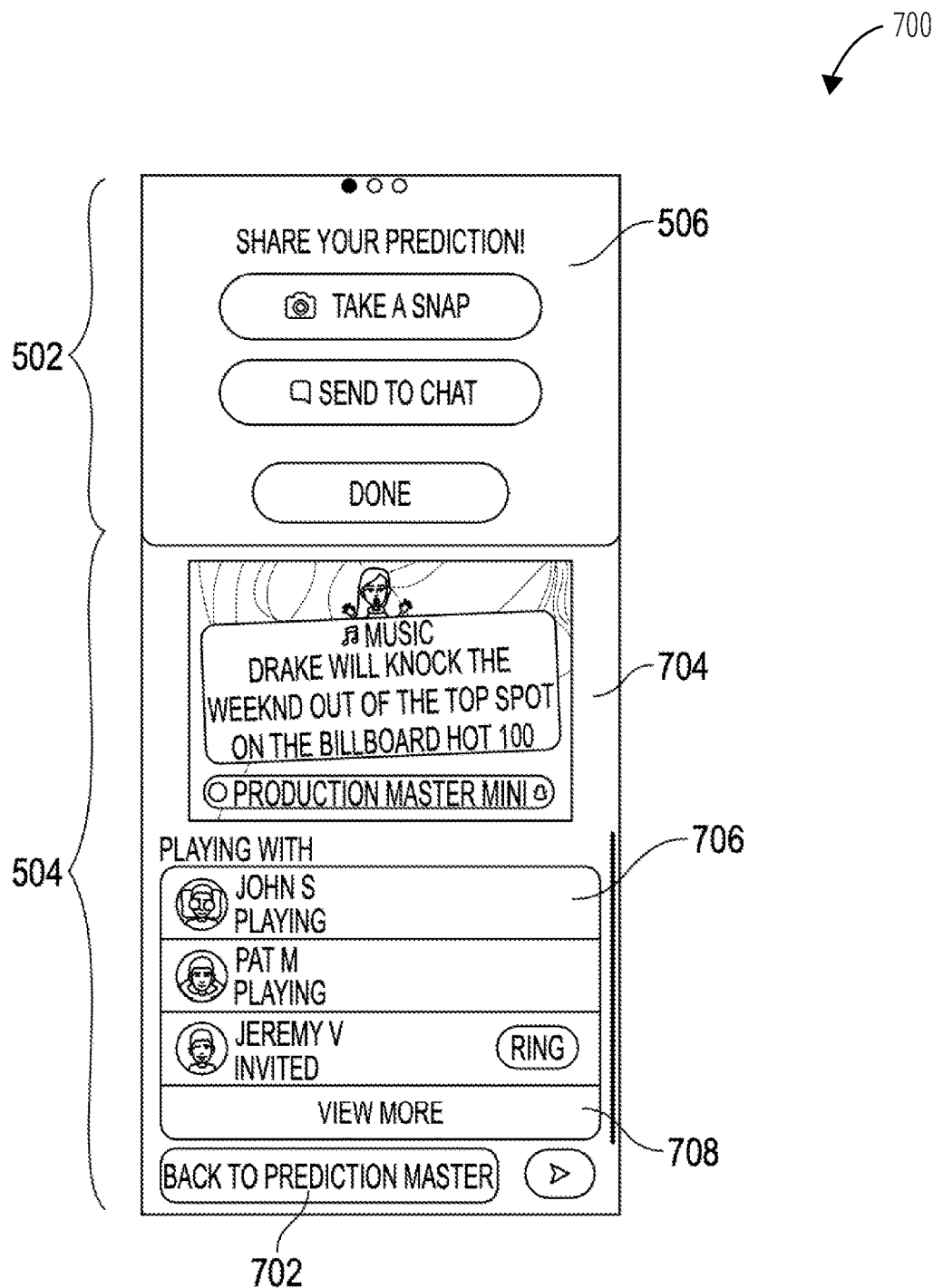
FIG. 7 illustrates an interface 700 in accordance with one embodiment.

FIG. 7 illustrates an interface 700 with a first portion of the display screen and a second portion of the display screen in an activated position in accordance with one embodiment. The game system 212 causes interface 700 to be displayed in response to detecting a selection by the user of chat selectable item 602.

As shown in interface 700, the first portion 502 is caused to contract while the second portion 504 is caused to expand and comprise a contextual sending interface (or contextual sending menu) that includes a preview 704 of the media content item 604 and a plurality of selectable items (e.g., selectable item 702, user selectable item 706, selectable item 708).

In FIG. 7, the game system 212 causing the first portion 502 and the second portion 504 to be in the activated position comprises causing the first portion 502 of the display screen to contract upwards by a predetermined distance. The application interface 506 is caused to be pushed upwards in the first portion 502 of FIG. 7. Accordingly, the top of the application interface 506 as shown in FIG. 6 is no longer visible in FIG. 7. The game system 212 also causes the second portion 504 of the display screen in FIG. 6 to expand upwards by the predetermined distance that was vacated by the first portion 502. In some embodiments, the contextual sending interface is displayed on the client device 106 to appear as though it exists behind the application interface 506. For example, when the application interface 506 is pushed upwards, the second portion 504 expands in a manner that reveals the settings menu from behind the application interface 506.

The contextual sending interface in the second portion 504 in interface 700 is contextual in that the contextual sending interface can include the name of the mini-application that is currently displayed in application interface 506 (e.g., Prediction Master) and the preview 704 for the media content item 604 associated with this mini-application.

In one embodiment, the game system 212 generates the preview 704 that is a preview of the media content item 604 to be transmitted to users associated with the user in the mini-application or in the messaging system 100.

The contextual sending interface in the second portion 504 in interface 700 can also be contextual in that it can comprises a plurality of selectable items (e.g., user selectable item 706) associated with each of the users in the list of users associated with the user on the mini-application. The user selectable item 706 can be associated with a single user or a group of users that is associated with the user on the mini-application. For example, the users that are associated with the user on the mini-application can be other users that are also running the mini-application on their client devices. If the mini-application is a multiplayer game, for instance, the users that are associated with the user on the mini-application are other users that are playing this multiplayer game with the user. In FIG. 7, the user can select the chat selectable item 602 to communicate with the respective users (e.g., Yamill, Patrick Mandia, Jeremy Voss), to send them the media content item 604 related to the mini-application, or to request that the messaging system 100 cause a notification to appear on the respective users' client devices (e.g., ring the user Jeremy Voss by activating the selectable text marked "Ring" in FIG. 7).

The contextual sending interface can also include the selectable item 708, when activated by the user, allows the user to view more of the contextual sending interface. When the selectable item 708 is activated, the game system 212 receives a request to display additional information included in the contextual sending interface and causes the second portion 504 to further expand or become larger. For example, by clicking on the selectable item 708, additional user selectable items 706 can be displayed in the expanded second portion 504.

The game system 212 can also cause the second portion 504 to become a scrollable interface when the selectable item 708 is activated or when a user provides an input on the display device such as a scrolling input on the second portion 504. A scrollable interface is one that the user can navigate by using a user input (e.g., scrolling motion including up-down, side-to-side on the display screen) to view portions of the interface that are not in view on the display screen.

In one embodiment, the game system 212 generating the settings menu based on the context of the client device 106 includes identifying the mini-application that is displayed in application interface 506, determining the settings associated with the mini-application, and establishing a configuration of the settings menu. The configuration of the settings menu can include the height of the settings menu and fixed or scrollable aspect of the settings menu. The height of the settings menu can then be used to determine the predetermined distance of the contraction of the first portion 502 and the expansion of the second portion 504.

The contextual sending interface can also include selectable item 702 (e.g., "Back to Prediction Master") that is associated with a request to return to the mini-application (e.g., interface 500). The selectable item 702 is generated based on the context of the client device 106 because it can indicate an identification of the mini-application that is currently in the application interface 506. When the user activates selectable item 702 on his client device 106, the game system 212 receives an input corresponding to a request to return to the inactivated position as shown in FIG. 5. This request allows the user to return playing or using the mini-application from the contextual sending interface. In response to receiving this request, the game system 212 causes the first portion 502 and the second portion 504 of the display screen to be displayed by the client device 106 in the inactivated position in FIG. 5.

While not shown, the user can request to return to interface 500 by selecting and dragging the first portion 502 in FIG. 7 downwards. In request to this selection and dragging input, the game system 212 can cause the client device 106 to display the first portion 502 in FIG. 7 to expand downwards, revealing the top of the application interface 506 that is not visible in FIG. 7. Simultaneously and proportionally to the expansion of first portion 502, the game system 212 can cause the client device 106 to display the second portion 504 in FIG. 7 to contract downwards, to cause the contextual sending interface to disappear out of view and to return to the action bar 516 in FIG. 5.

Process of Generating a Contextual Sending Menu

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Figure 8:
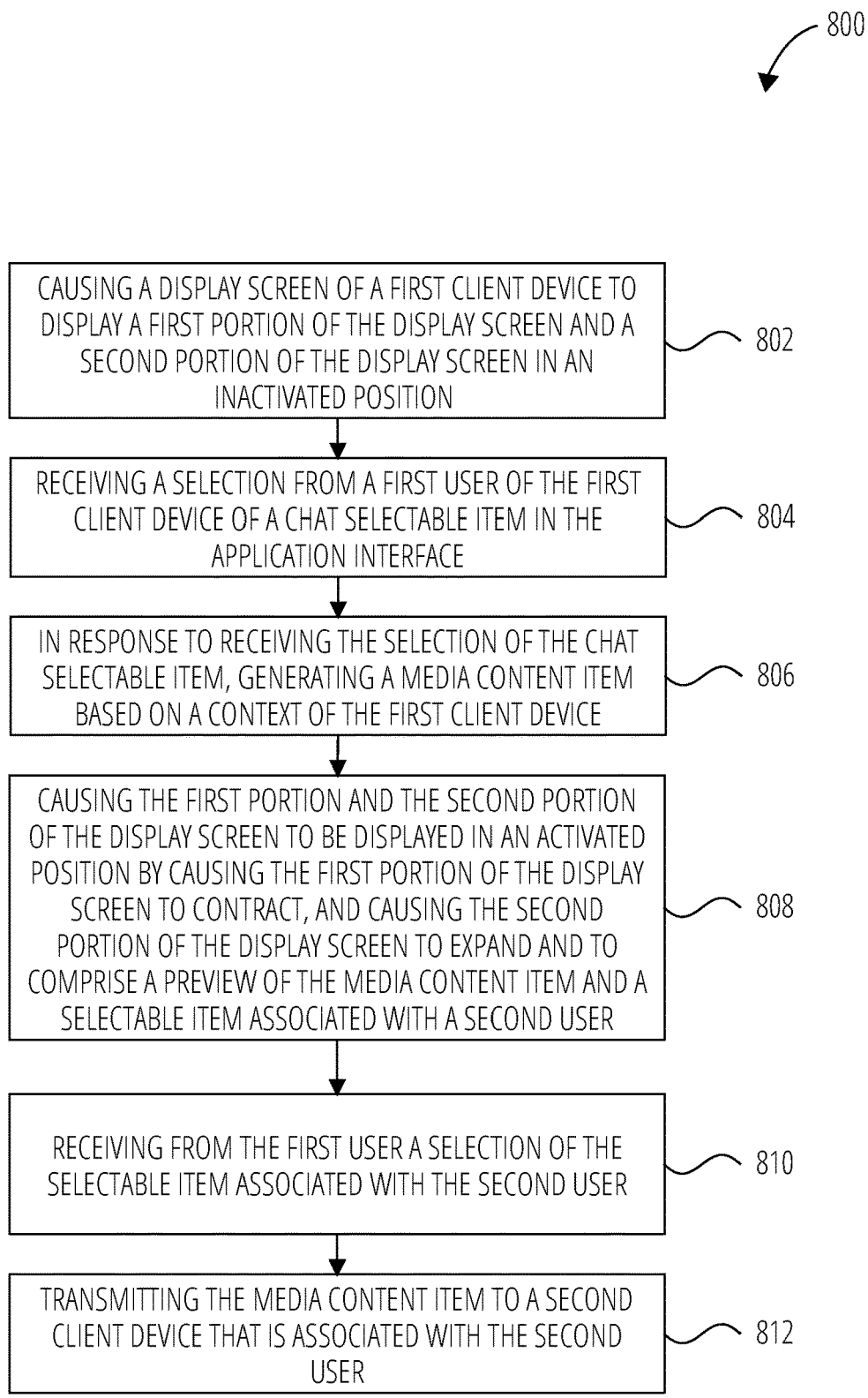
FIG. 8 illustrates a process 800 of generating a contextual sending menu in accordance with one embodiment.

FIG. 8 illustrates a process 800 of generating a contextual sending menu in accordance with one embodiment. At operation 802, a processor causes a display screen of a first client device 106 to display a first portion 502 of the display screen and a second portion 504 of the display screen in an inactivated position. The processor can cause the first portion 502 to display an application interface associated with an application and cause the second portion 504 to display an action bar that is associated with a messaging system 100.

At operation 804, the processor receives a selection from a first user of the first client device 106 of a chat selectable item 602 in the application interface 506. The chat selectable item 602 is associated with a communication interface of the messaging system 100. At operation 806, in response to receiving the selection of the chat selectable item 602, the processor generates a media content item 604 based on a context of the first client device 106.

The processor then causes the first portion 502 and the second portion 504 of the display screen to be displayed in an activated position at operation 808. In one embodiment, to cause the first portion 502 and the second portion 504 to be displayed in the activated position, the processor can cause the first portion 502 of the display screen to contract. To cause the first portion 502 and the second portion 504 to be displayed in the activated position, the processor can also cause the second portion 504 of the display screen to expand and to comprise a preview 704 of the media content item 604 and a user selectable item 706 associated with a second user.

At operation 810, the processor receives from the first user a selection of the user selectable item 706 associated with the second user and at operation 812, the processor transmits the media content item 604 to a second client device 106 that is associated with the second user. In one embodiment, the processor further causes the communication interface for a communication session to be displayed at the second client device 106. In this example, the first user and the second user are users of the messaging system 100, and the communication session is between a plurality of client devices including the first client device 106 and the second client device 106. The processor can further cause the media content item 604 to be displayed in the communication interface at the second client device 106.

Machine Architecture

Figure 9:
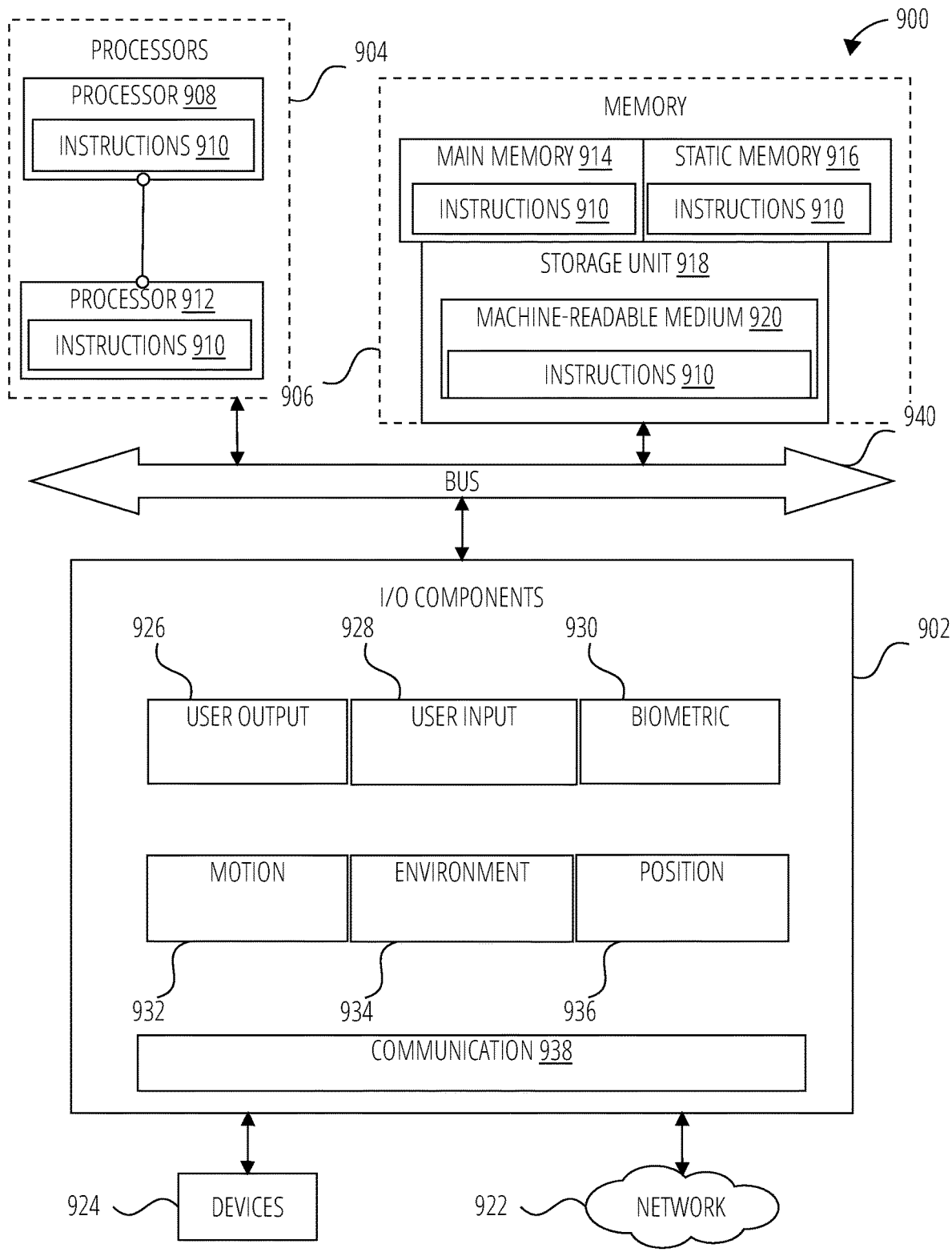
FIG. 9 is a diagrammatic representation of a machine in the form of a computer system within which a set of instructions may be executed for causing the machine to perform any one or more of the methodologies discussed herein, in accordance with some examples.

FIG. 9 is a diagrammatic representation of the machine 900 within which instructions 910 (e.g., software, a program, an application, an applet, an app, or other executable code) for causing the machine 900 to perform any one or more of the methodologies discussed herein may be executed. For example, the instructions 910 may cause the machine 900 to execute any one or more of the methods described herein. The instructions 910 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 910, sequentially or otherwise, that specify actions to be taken by the machine 900. Further, while only a single machine 900 is illustrated, the term "machine" shall also be taken to include a collection of machines that individually or jointly execute the instructions 910 to perform any one or more of the methodologies discussed herein. The machine 900, for example, may comprise the client device 106 or any one of a number of server devices forming part of the messaging server system 104. In some examples, the machine 900 may also comprise both client and server systems, with certain operations of a particular method or algorithm being performed on the server-side and with certain operations of the particular method or algorithm being performed on the client-side.

The machine 900 may include processors 904, memory 906, and input/output I/O components 638, which may be configured to communicate with each other via a bus 940. In an example, the processors 904 (e.g., a Central Processing Unit (CPU), a Reduced Instruction Set Computing (RISC) Processor, a Complex Instruction Set Computing (CISC)

Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 908 and a processor 912 that execute the instructions 910. The term "processor" is intended to include multi-core processors that may comprise two or more independent processors (sometimes referred to as "cores") that may execute instructions contemporaneously. Although FIG. 9 shows multiple processors 904, the machine 900 may include a single processor with a single-core, a single processor with multiple cores (e.g., a multi-core processor), multiple processors with a single core, multiple processors with multiples cores, or any combination thereof.

The memory 906 includes a main memory 914, a static memory 916, and a storage unit 918, both accessible to the processors 904 via the bus 940. The main memory 906, the static memory 916, and storage unit 918 store the instructions 910 embodying any one or more of the methodologies or functions described herein. The instructions 910 may also reside, completely or partially, within the main memory 914, within the static memory 916, within machine-readable medium 920 within the storage unit 918, within at least one of the processors 904 (e.g., within the Processor's cache memory), or any suitable combination thereof, during execution thereof by the machine 900.

The I/O components 902 may include a wide variety of components to receive input, provide output, produce output, transmit information, exchange information, capture measurements, and so on. The specific I/O components 902 that are included in a particular machine will depend on the type of machine. For example, portable machines such as mobile phones may include a touch input device or other such input mechanisms, while a headless server machine will likely not include such a touch input device. It will be appreciated that the I/O components 902 may include many other components that are not shown in FIG. 9. In various examples, the I/O components 902 may include user output components 926 and user input components 928. The user output components 926 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 928 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 902 may include biometric components 930, motion components 932, environmental components 934, or position components 936, among a wide array of other components. For example, the biometric components 930 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 932 include acceleration sensor components (e.g., accelerometer), gravitation sensor components, rotation sensor components (e.g., gyroscope).

The environmental components 934 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 106 may have a camera system comprising, for example, front cameras on a front surface of the client device 106 and rear cameras on a rear surface of the client device 106. The front cameras may, for example, be used to capture still images and video of a user of the client device 106 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 106 may also include a 360° camera for capturing 360° photographs and videos.

Further, the camera system of a client device 106 may include dual rear cameras (e.g., a primary camera as well as a depth-sensing camera), or even triple, quad or penta rear camera configurations on the front and rear sides of the client device 106. These multiple cameras systems may include a wide camera, an ultra-wide camera, a telephoto camera, a macro camera and a depth sensor, for example.

The position components 936 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 902 further include communication components 938 operable to couple the machine 900 to a network 922 or devices 924 via respective coupling or connections. For example, the communication components 938 may include a network interface Component or another suitable device to interface with the network 922. In further examples, the communication components 938 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 924 may be another machine or any of a wide variety of peripheral devices (e.g., a peripheral device coupled via a USB).

Moreover, the communication components 938 may detect identifiers or include components operable to detect identifiers. For example, the communication components 938 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 938, such as location via Internet Protocol (IP) geolocation, location via Wi-Fi® signal triangulation, location via detecting an NFC beacon signal that may indicate a particular location, and so forth.

The various memories (e.g., main memory 914, static memory 916, and memory of the processors 904) and storage unit 918 may store one or more sets of instructions and data structures (e.g., software) embodying or used by any one or more of the methodologies or functions described herein. These instructions (e.g., the instructions 910), when executed by processors 904, cause various operations to implement the disclosed examples.

The instructions 910 may be transmitted or received over the network 922, using a transmission medium, via a network interface device (e.g., a network interface component included in the communication components 938) and using any one of several well-known transfer protocols (e.g., hypertext transfer protocol (HTTP)). Similarly, the instructions 910 may be transmitted or received using a transmission medium via a coupling (e.g., a peer-to-peer coupling) to the devices 924.

Software Architecture

Figure 10:
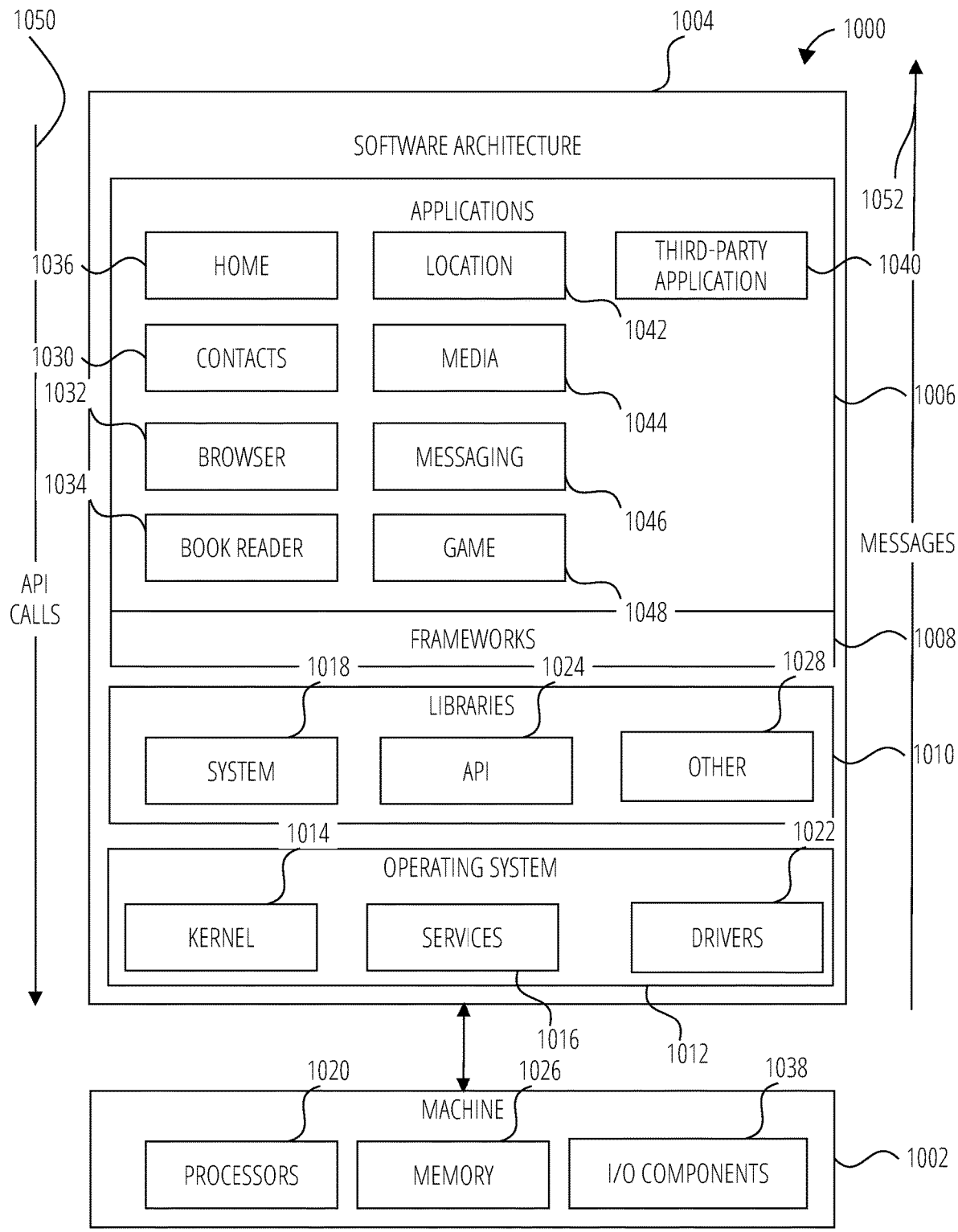
FIG. 10 is a block diagram showing a software architecture within which examples may be implemented.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1010 provide a common low-level infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a common high-level infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1050 provided by the operating system 1012 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting, or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
causing, by a processor, a display screen of a first client device associated with a first user to display a first portion of the display screen and a second portion of the display screen in an inactivated position by
causing the first portion to display an application interface associated with an application, and
causing the second portion to display an action bar that is associated with a messaging system;
in response to receiving a selection of a chat selectable item included in the application interface, generating a media content item based on a context of the first client device, wherein the media content item comprises information associated with the first user in the application;
causing the first portion and the second portion of the display screen to be displayed in an activated position by
causing the first portion of the display screen to contract, and
causing the second portion of the display screen to expand and to comprise a preview of the media content item and a selectable item associated with a second user, wherein the selectable item comprises a name or an avatar associated with the second user.

2. The method of claim 1, further comprising:
receiving from the first user a selection of the selectable item associated with the second user;
transmitting the media content item to a second client device that is associated with the second user; and
causing a communication interface of the messaging system for a communication session to be displayed at the second client device.

3. The method of claim 2,
wherein the first user and the second user are users of the messaging system, and wherein the communication session is between a plurality of client devices including the first client device and the second client device.

4. The method of claim 3, further comprising:
causing the media content item to be displayed in the communication interface at the second client device.

5. The method of claim 1, wherein the context of the first client device is based on information including user information, activity information on the application, selection information on the application, game scoring information on the application, ranking information on the application, a list of users associated with the first user on the application, or a list of users associated with the first user on the messaging system.

6. The method of claim 1, further comprising:
causing an application icon to be displayed by the display screen, the icon being associated with the application;
receiving a selection of the application icon, wherein the processor causes the display screen of the first client device to display the application interface in response to the selection of the application icon.

7. The method of claim 1, wherein the first portion of the display screen in the inactivated position is greater in size than the second portion of the display screen in the inactivated position.

8. The method of claim 1, wherein the first portion of the display screen is a top portion of the display screen and the second portion of the display screen is a bottom portion of the display screen.

9. The method of claim 8, wherein causing the first portion and the second portion of the display screen to be in the activated position further comprises:
causing the first portion of the display screen to contract upwards by a predetermined distance, wherein the application interface displayed in the first portion is pushed upwards, and
causing the second portion of the display screen to expand upwards by the predetermined distance.

10. The method of claim 1, further comprising:
in response to the media content item being transmitted, causing the first portion and the second portion of the display screen to be displayed by the first client device in the inactivated position.

11. A non-transitory computer-readable storage medium having stored thereon instructions, when executed by a processor, causes the processor to perform operations comprising:
causing a display screen of a first client device associated with a first user to display a first portion of the display screen and a second portion of the display screen in an inactivated position by
causing the first portion to display an application interface associated with an application, and
causing the second portion to display an action bar that is associated with a messaging system;
in response to receiving a selection of a chat selectable item in the application interface from a first user of the first client device, generating a media content item based on a context of the first client device, wherein the media content item comprises information associated with the first user in the application; and
causing the first portion and the second portion of the display screen to be displayed in an activated position by
causing the first portion of the display screen to contract, and
causing the second portion of the display screen to expand and to comprise a preview of the media content item and a selectable item associated with a second user, wherein the selectable item comprises a name or an avatar associated with the second user.

12. The non-transitory computer-readable storage medium of claim 11, wherein the operations further comprise:
receiving from the first user a selection of the selectable item associated with the second user;
transmitting the media content item to a second client device that is associated with the second user; and
causing a communication interface of the messaging system for a communication session to be displayed at the second client device.

13. The non-transitory computer-readable storage medium of claim 12,
wherein the first user and the second user are users of the messaging system, and wherein the communication session is between a plurality of client devices including the first client device and the second client device.

14. The non-transitory computer-readable storage medium of claim 13, wherein the operations further comprise:
causing the media content item to be displayed in the communication interface at the second client device.

15. The non-transitory computer-readable storage medium of claim 11, wherein the context of the first client device is based on information including user information, activity information on the application, selection information on the application, game scoring information on the application, ranking information on the application, a list of users associated with the first user on the application, or a list of users associated with the first user on the messaging system.

16. The non-transitory computer-readable storage medium of claim 11, wherein the operations further comprise:
causing an application icon to be displayed by a display screen, the icon being associated with the application;
receiving a selection of the application icon, wherein the processor causes the display screen of the first client device to display the application interface in response to the selection of the application icon.

17. The non-transitory computer-readable storage medium of claim 11, wherein the first portion of the display screen in the inactivated position is greater in size than the second portion of the display screen in the inactivated position.

18. The non-transitory computer-readable storage medium of claim 11, wherein the first portion of the display screen is a top portion of the display screen and the second portion of the display screen is a bottom portion of the display screen.

19. The non-transitory computer-readable storage medium of claim 18, wherein causing the first portion and the second portion of the display screen to be in the activated position further comprises:
causing the first portion of the display screen to contract upwards by a predetermined distance, wherein the application interface displayed in the first portion is pushed upwards, and
causing the second portion of the display screen to expand upwards by the predetermined distance.

20. The non-transitory computer-readable storage medium of claim 11, wherein the operations further comprise:
in response to the media content item being transmitted, causing the first portion and the second portion of the display screen to be displayed by the first client device in the inactivated position.

21. A system comprising:
a processor; and
a memory having instructions stored thereon, when executed by the processor, causes the system to perform operations comprising:
causing a display screen of a first client device associated with a first user to display a first portion of the display screen and a second portion of the display screen in an inactivated position by
causing the first portion to display an application interface associated with an application, and
causing the second portion to display an action bar that is associated with a messaging system;
in response to receiving a selection of a chat selectable item in the application interface from a first user of the first client device, generating a media content item based on a context of the first client device, wherein the media content item comprises information associated with the first user in the application; and
causing the first portion and the second portion of the display screen to be displayed in an activated position by
causing the first portion of the display screen to contract, and
causing the second portion of the display screen to expand and to comprise a preview of the media content item and a selectable item associated with a second user, wherein the selectable item comprises a name or an avatar associated with the second user.

* * * * *